(12) United States Patent
Pradel et al.

(10) Patent No.: US 6,220,408 B1
(45) Date of Patent: Apr. 24, 2001

(54) SPRING AND DAMPER UNIT WITH EXTERNAL STORAGE DEVICE

(75) Inventors: Robert Pradel, Röthlein/Heidenfeld; Günther Handke, Euerbach, both of (DE)

(73) Assignee: Mannesmann Sachs AG, Schweinfurt (DE)

( * ) Notice: Subject to any disclaimer, the term of this patent is extended or adjusted under 35 U.S.C. 154(b) by 0 days.

(21) Appl. No.: 09/210,173

(22) Filed: Dec. 11, 1998

(30) Foreign Application Priority Data

Dec. 11, 1997 (DE) .............................................. 197 55 039

(51) Int. Cl.[7] ........................................................ F16F 9/00
(52) U.S. Cl. ...................................... 188/314; 188/322.19
(58) Field of Search ..................................... 188/314, 297, 188/298, 321.11, 322.19, 322.2; 280/124.146, 124.147, 124.154, 124.155

(56) References Cited

U.S. PATENT DOCUMENTS

| | | | |
|---|---|---|---|
| 4,010,829 | * | 3/1977 | Naito et al. ........................... 188/278 |
| 4,515,253 | * | 5/1985 | Itoh ....................................... 188/314 |
| 4,545,601 | * | 10/1985 | Muller et al. ......................... 280/668 |
| 4,732,244 | * | 3/1988 | Verkuylen ............................. 188/318 |
| 5,016,911 | * | 5/1991 | Takehara et al. ..................... 280/708 |
| 5,094,325 | * | 3/1992 | Smith .................................... 188/282 |
| 5,360,230 | * | 11/1994 | Yamada et al. ....................... 280/707 |
| 5,924,528 | * | 7/1999 | Vermolen et al. ................. 188/266.1 |
| 5,988,332 | * | 11/1999 | Marzocchi et al. ............... 188/322.2 |

FOREIGN PATENT DOCUMENTS

| | | | |
|---|---|---|---|
| 28 21 492 | 11/1979 | (DE) | ................................ F16B/1/04 |
| 28 55 561 | 7/1980 | (DE) | ............................. B60G/15/12 |
| 42 33 701 A1 | 4/1994 | (DE) | ................................ F16F/9/16 |
| 2-212207 | 2/1989 | (JP) | ............................. B60G/13/08 |

* cited by examiner

Primary Examiner—Robert J. Oberleitner
Assistant Examiner—Bradley King
(74) Attorney, Agent, or Firm—Cohen, Pontani, Lieberman & Pavane

(57) ABSTRACT

The invention relates to a spring-and-damper unit with an external storage device for installation between a vehicle body and a wheel guidance part. To create the greatest possible supporting length for the piston rod in a given installation space, the storage device is preferably connected to a spring plate, on which rests a carrying spring embodied as a coil spring, while the spring plate is arranged in a pressure-tight fashion on the cylinder or a container surrounding the cylinder. The interior of the cylinder or the container is hydraulically connected to the storage device via a connecting channel in the spring plate.

13 Claims, 8 Drawing Sheets

SPRING AND DAMPER UNIT WITH EXTERNAL STORAGE DEVICE

BACKGROUND OF THE INVENTION

1. Field of the Invention

The present invention relates to a spring-and-damper unit for installation between a vehicle body and a wheel guidance part of a motor vehicle. More specifically, the present invention relates to a spring and damper unit including a vibration damper and a spring, wherein the vibration damper has a piston rod having a piston which runs in a cylinder and divides the cylinder into a first working space surrounding the piston rod and a second working space remote from the piston rod. The vibration damper further includes a storage space arranged outside of the cylinder hydraulically connected to the second working space and serves as a compensation space for the piston rod volume moving into and out of the cylinder.

2. Description of the Related Art

A prior art vibration damper is disclosed in reference DE 42 33 701 A1. This reference discloses a storage device and/or compensation space arranged outside of a cylinder of the vibration damper and in which a gas space is separated from a fluid space in the interior of the storage space by a diaphragm. An embodiment with a second compensation space also exists. This type of vibration damper is designed to combine the advantages of a two-pipe vibration damper with those of a one-pipe vibration damper, to achieve a vibration damper with improved damping properties. However, the separating element between the gas space and the fluid space in the storage device is essential in this type of vibration damper to prevent the gas from going into solution in the damping fluid and to thus preclude the formation of a gas cushion in one working space. This is needed to ensure a correct response by the vibration damper even in the event of small strokes.

Another type of prior art vibration damper is disclosed, for example, in references DE 28 21 492 A1 and DE 28 55 561 A1. These spring-and-damper units include a spring or compensation space located outside of a cylinder of a vibration damper with a diaphragm between the gas filling and the damping fluid filling in the spring or compensation space. An embodiment with a spring space whose gas filling is separated from the damping fluid filling by a separating piston is also described. Such spring-and-damper units are used for the suspension and damping of the rear wheel in motorcycles and are installed between the rear wheel rocker arm and the frame so that the units do not have to absorb any wheel guidance forces.

SUMMARY OF THE INVENTION

The object of the present invention is to provide a spring-and-damper unit arrangeable within a predetermined installation space in a motor vehicle that has the greatest possible supporting length for the piston rod in the cylinder and, in addition, is subject to low bending moment of the parts axially movable relative to each other so that the spring-and-damper unit can absorb wheel guidance forces, and has a simple and economical overall structure.

This object is attained by the present invention in that a storage device is connected to a spring plate on which a carrying spring of the spring-and-damper unit rests. The spring plate is arranged in a pressure-tight fashion on a cylinder or a container surrounding the cylinder of the vibration damper. The interior of the cylinder or the container is hydraulically connected to the storage device via a connecting channel in the spring plate. This arrangement in which the storage device is located outside the cylinder or container and is connected to the spring plate permits full utilization of the installation length available to support the piston rod so that a relatively great supporting length for the piston rod in the cylinder is ensured even when the spring-and-damper unit is in the rebound state. Because such spring-and-damper units usually must absorb wheel guidance forces, the large supporting length of the piston rod prevents the parts axially movable relative to each other from jamming, and thus ensures high functional reliability and good response behavior of the spring-and-damper unit. Moreover, the extra function of the spring plate as accommodating the storage device and forming the connecting channel to the interior of the vibration damper, a simple and economical overall structure is attained.

The smallest possible bending moment is exerted by the wheel guidance forces on the relatively-moving parts of the spring-and-damper unit when the spring-and-damper unit is attached as close to the vehicle wheel as possible. Mounting of the spring-and-damper unit in close proximity to the vehicle wheel is possible in the inventive device because the spring plate is connected to the storage device to form a structural and assembly unit and because the storage device is located on the side of the vibration damper away from the vehicle wheel. The spring plate is seated above the tire so that the cylinder or container of the vibration damper may be installed in the vehicle at a very close proximity to the tire.

In a further embodiment, the spring plate has an interior embodied as the storage device and preferably formed by two shells, which are produced, for example, as stamped or pressed parts from steel sheet. Moreover, according to a further feature of the invention, an advantageous and economical embodiment is obtained by forming a structural and assembly unit with the spring plate, the storage device, and a steering lever. The storage device is connected to the spring plate so that its axis is arranged parallel or somewhat inclined relative to the axis of the vibration damper and so that the storage device wall is located at a slight radial distance from the outer wall of the cylinder or the container.

According to the invention, an especially strong connection between the storage device and the vibration damper is attained by the fact that a bottom of the storage device has a fastening journal connectable with a connecting part of the vibration damper for securely connecting the storage device to the vibration damper. As a result, the storage device is connected at a first connection to the spring plate and at a second connection to the vibration damper.

To permit the deepest possible travel of the piston rod into the cylinder, a bottom valve is usually arranged in the cylinder to be installed in the storage device. In a highly advantageous embodiment, the bottom valve is arranged and secured in the connection cover, thus creating a structural unit that may be checked before being assembled with the other storage device parts.

In a further embodiment, the axis of the storage device is arranged approximately perpendicular to the axis of the vibration damper, whereby the bottom of the storage device is connected with a steering lever. Thus, the storage device can be embodied both as a spring plate and as a steering lever, especially when this combination part is produced in a casting process.

There is great freedom in embodying the storage device. For example, it may be embodied as a separating piston storage device, whereby the storage device wall and the storage device bottom are produced in a single piece, or the storage device wall and the connecting cover may be produced in a single piece with the connecting cover using, for example, an extrusion method. The bottom valve can be arranged in the fluid space of the storage device to permit the deepest possible travel of the piston rod into the cylinder.

The objects of the present invention, which are to provide the greatest possible bearing distance of the piston rod in the cylinder and to provide an installation of the vibration damper in close proximity to the vehicle wheel, is attained in one embodiment by connecting the storage device to the cylinder bottom so that the axis of the storage device is inclined relative to the axis of the vibration damper and a length of the storage device runs by a drive shaft of the vehicle wheel at a distance. Such a design of a spring-and-damper unit or of a vibration damper is especially suitable for motor vehicles with front-wheel drive.

The various features of novelty which characterize the invention are pointed out with particularity in the claims annexed to and forming a part of the disclosure. For a better understanding of the invention, its operating advantages, and specific objects attained by its use, reference should be had to the drawing and descriptive matter in which there are illustrated and described preferred embodiments of the invention.

BRIEF DESCRIPTION OF THE DRAWINGS

In the drawings, wherein like reference characters denote similar elements throughout the several views.

DETAILED DESCRIPTION OF THE PRESENTLY PREFERRED EMBODIMENTS

Figure 1:
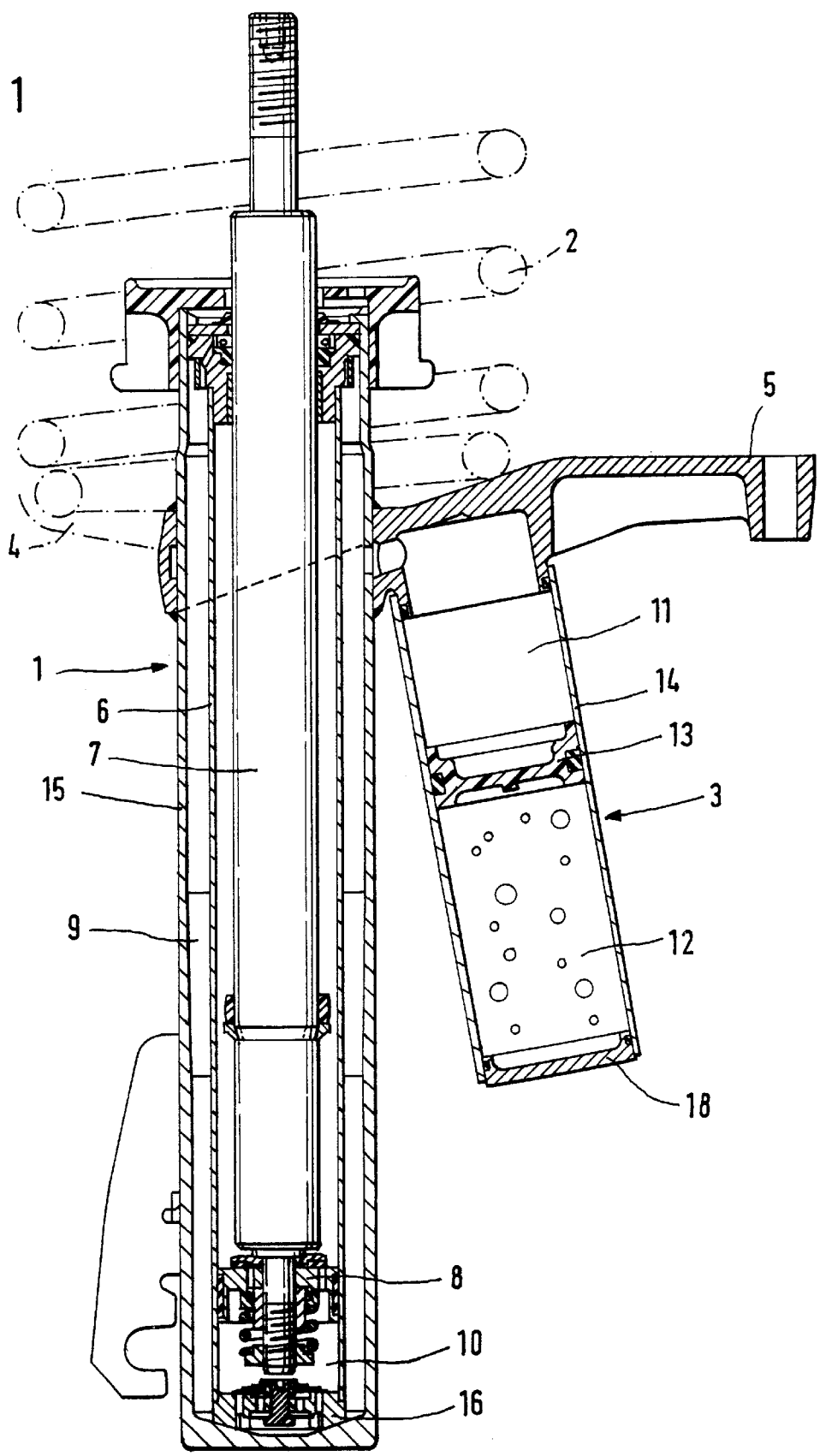
FIG. 1 is a longitudinal sectional view of an embodiment of a spring-and-damper unit according to the present invention with a laterally arranged storage device.

A spring-and-damper unit 30 according to an embodiment of the present invention shown in FIG. 1 has a vibration damper 1, a coil spring 2, and an externally arranged storage device 3. The coil spring 2 is a carrying spring of the spring-and-damper unit 30 which rests between the vehicle body and a spring plate 4, which is connected in pressure-tight fashion to the container 15 of the vibration damper 1. The spring plate 4 has a connection for the storage device 3 and a steering lever 5. A cylinder 6 is arranged in the container 15 at a radial distance from an inner wall of the container 15 in which a damping piston 8 connected to one end of a piston rod 7 runs in an axially movable and outwardly sealing fashion. The interior of the cylinder 6 is filled with damping fluid and is divided by the damping piston 8 into a working space 9 near the piston rod 7 and a working space 10 remote from the piston rod. The interior of the cylinder 6 is hydraulically connected via a bottom valve 16 to the annular space (also filled with damping fluid) that is bordered by an outer wall of the cylinder 6 and the inner wall of the container 15. To compensate for the volume of the piston rod 7 moving into or out of the cylinder 6, the annular space is connected via a connecting channel 21 to a fluid space 11 of the storage device 3. A storage device wall 14 of the storage device 3 is seated in a pressure-tight fashion on the spring plate 4 and simultaneously includes a bottom 18. A usually pressurized gas space 12 located in the storage device 3 is separated from the fluid space 11 by a separating piston 13 run in an axially movable and sealed fashion on an inner surface of the storage device wall 14. The annular space between the cylinder 6 and the container 15 may be narrowly embodied because it serves only as a fluid conduit between the working space 10 remote from the piston rod 7 and the fluid space 11 in the storage device 3.

In a preferred embodiment, the storage device 3 is arranged on a side of the vibration damper 1 facing away from the vehicle wheel, not only to allow implementation of a large supporting length for the piston 7, but also to permit installation close to the vehicle tire, so that the bending moments exercised by the wheel guidance forces on the spring-and-damper unit 30 may be kept as small as possible.

Figure 2:
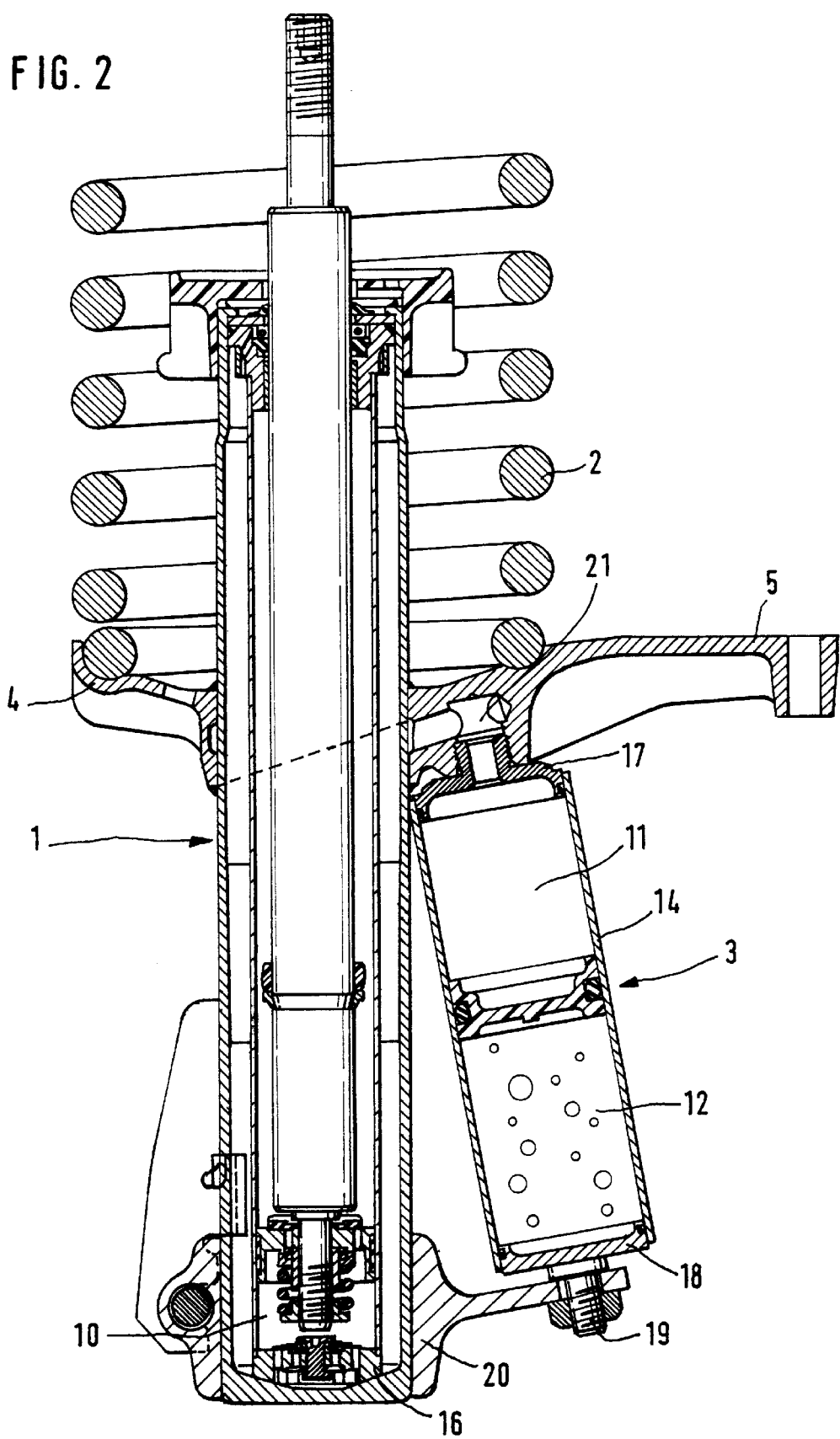
FIG. 2 is a longitudinal sectional view of another embodiment of the spring-and-damper unit having an additional clamping point.

The embodiment in FIG. 2 differs from that in FIG. 1 essentially in that the storage device 3 connected to the spring plate 4 is screwed into a threaded hole in the spring plate 4 by a connecting cover 17 equipped with a connecting thread. In addition, the bottom 18 of the storage device 3 has a fastening journal 19 which is connected to a connecting part 20 of the vibration damper 1 to establish a very stable connection between the storage device 3 and the vibration damper 1. The other reference numbers in FIG. 2 correspond to those described above with reference to FIG. 1.

Figure 3:
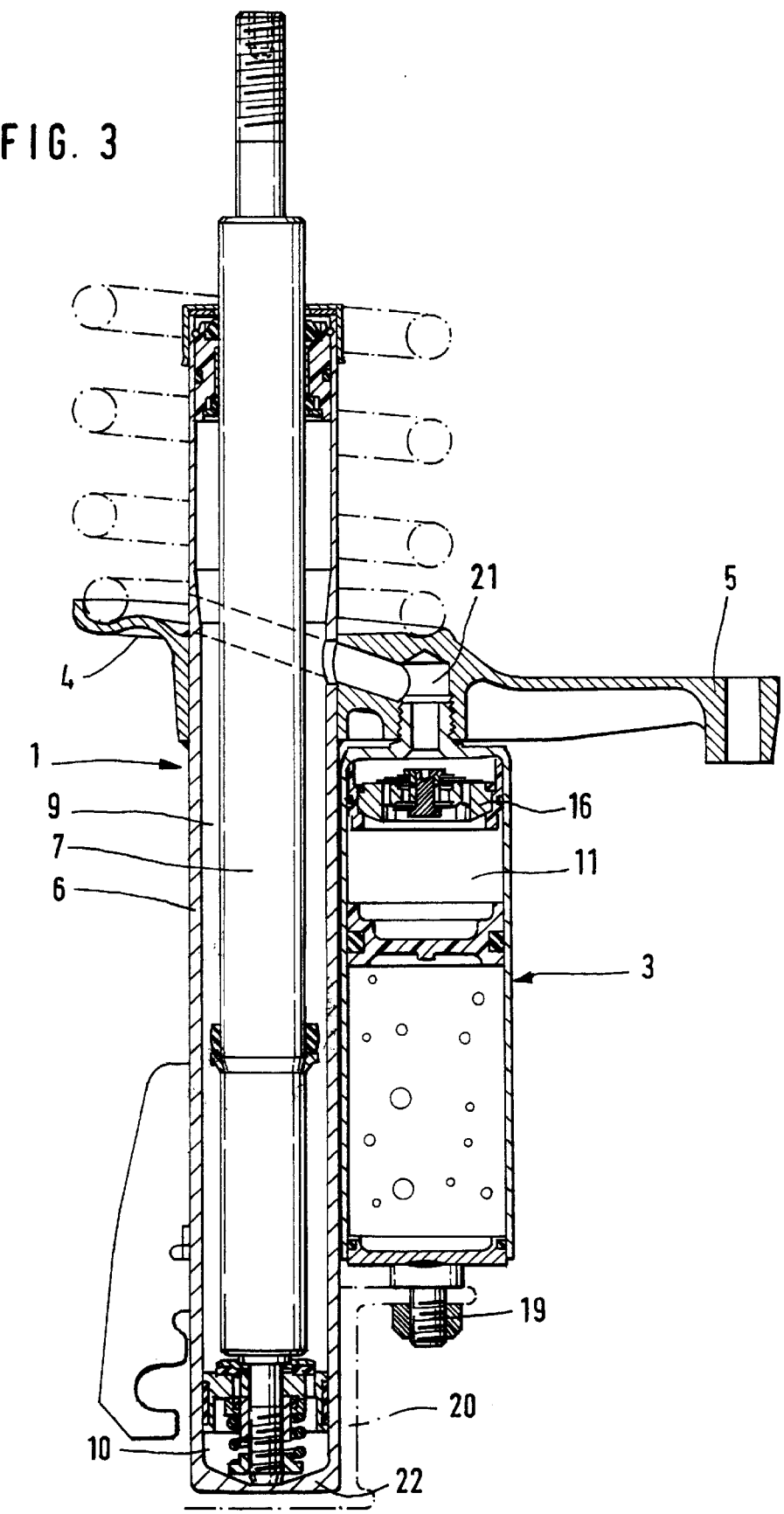
FIG. 3 is a longitudinal sectional view of another embodiment of a spring-and-damper unit having a storage device arranged axis parallel to a vibration damper.

In the embodiment of the spring-and-damper 30 unit in FIG. 3, the storage device 3, whose axis runs parallel to the axis of the vibration damper 1, has a bottom valve 16 in the fluid space 11 that enables the piston rod 7 to travel into the cylinder 6 to the cylinder bottom 22. Therefore, the bearing distance for the piston rod 7 is optimally used. Moreover, the piston rod 7 may be arranged very close to the vehicle wheel, because this embodiment has only one cylinder 6 and because the working space 9 near the piston rod is hydraulically connected to the fluid space 11 via the connecting channel 21 in the spring plate 4 and the bottom valve 16.

Figure 4:
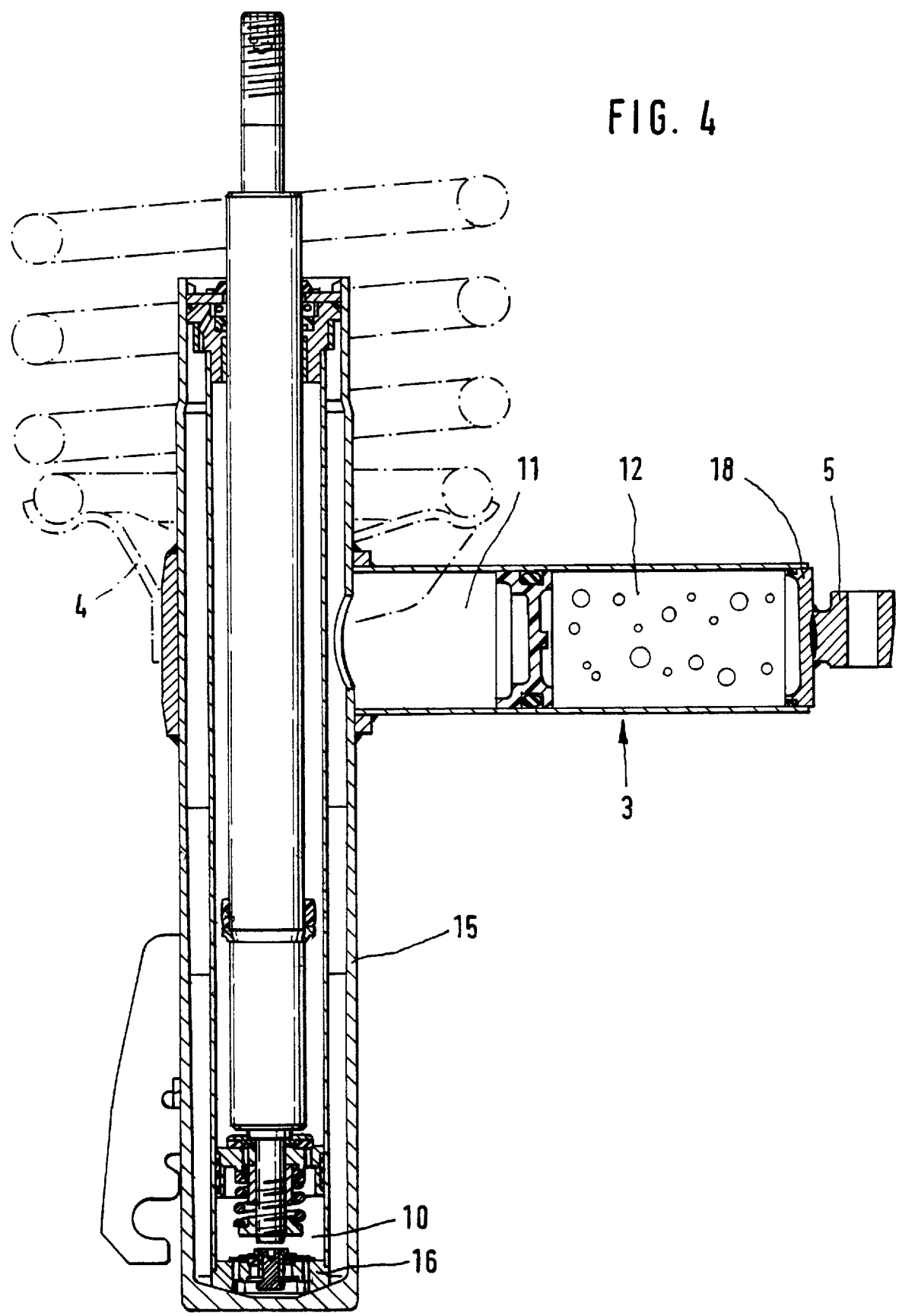
FIG. 4 is a longitudinal sectional view of another embodiment of a spring-and-damper unit a storage device having an axis perpendicular to the vibration damper.

A further embodiment of the spring-and-damper unit 30 is shown in FIG. 4. The longitudinal axis of the storage device 3 runs roughly perpendicular to the longitudinal axis of the container 15. The bottom 18 of the storage device 3 is connected to the steering lever 5 and a portion of the storage device 3 attached in pressure-tight fashion to the container 15 supports the spring plate 4.

Figure 5:
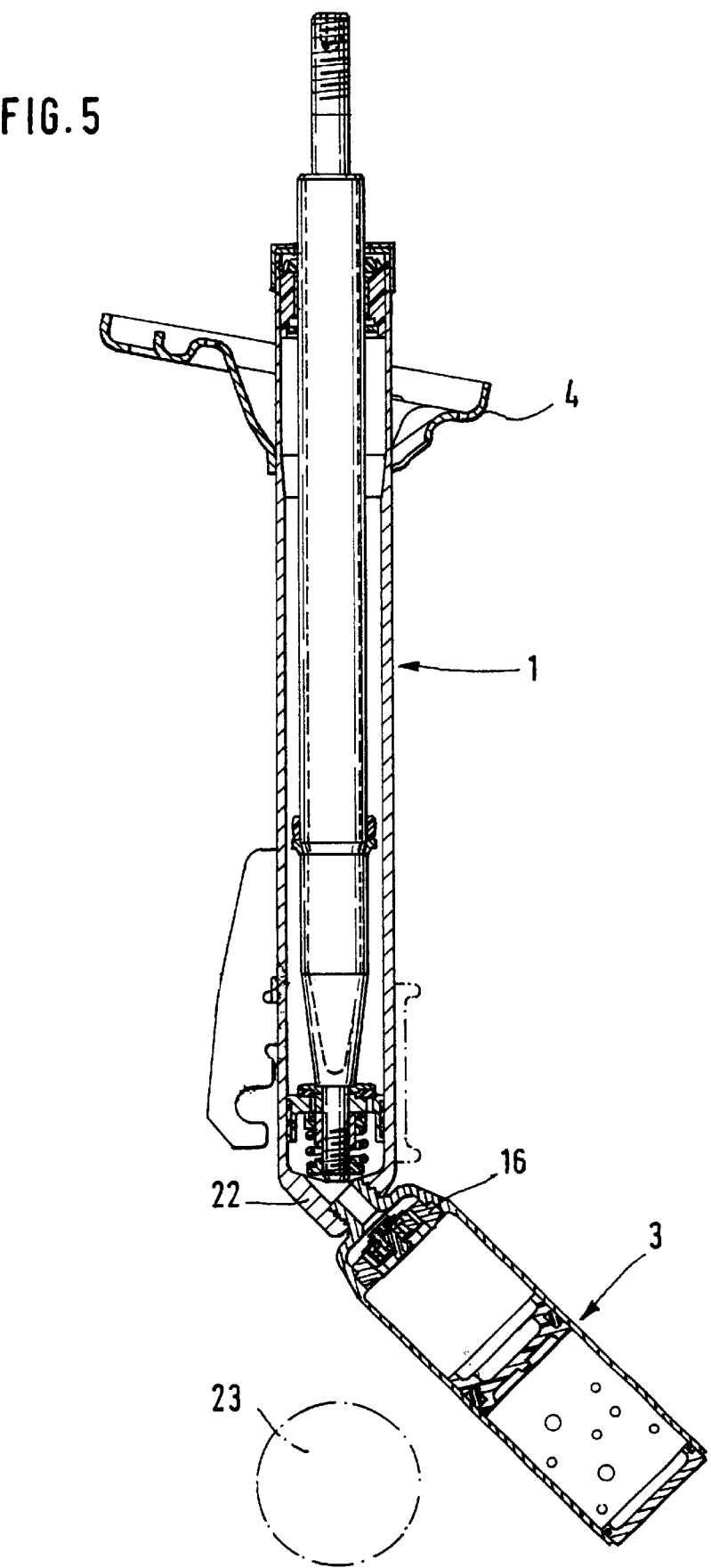
FIG. 5 is a longitudinal sectional view of another embodiment of a spring-and-damper unit which in the storage device is connected to a bottom of a cylinder of the vibration damper.

In the embodiment shown in FIG. 5, the vibration damper 1 is embodied as a one-tube vibration damper so that the inner walls of the container 15 form the cylinder in which the piston 8 is axially movable in a sealed fashion. Therefore, this embodiment does not require a separate cylinder 6 inside the container. A cylinder bottom 22 at the bottom of container 15 includes a connection for the storage device 3. The axis of the storage device 3 is inclined relative to the axis of the vibration damper 1 in such a way that the longitudinal length of the storage device 3 passes a drive shaft 23 of the vehicle wheel at a distance. A spring-and-damper unit 30 of this design also permits the object of the invention, i.e., the greatest possible bearing distance and arrangement in the immediate vicinity of the wheel, to be attained, in particular, for front-wheel drive vehicles. Thus, the bottom valve 16 is arranged in the storage device 3, and the storage device can extend into the wheel disk, because there is enough room available at this location between the drive shaft, the brake caliper and the axle guides.

Figure 6:
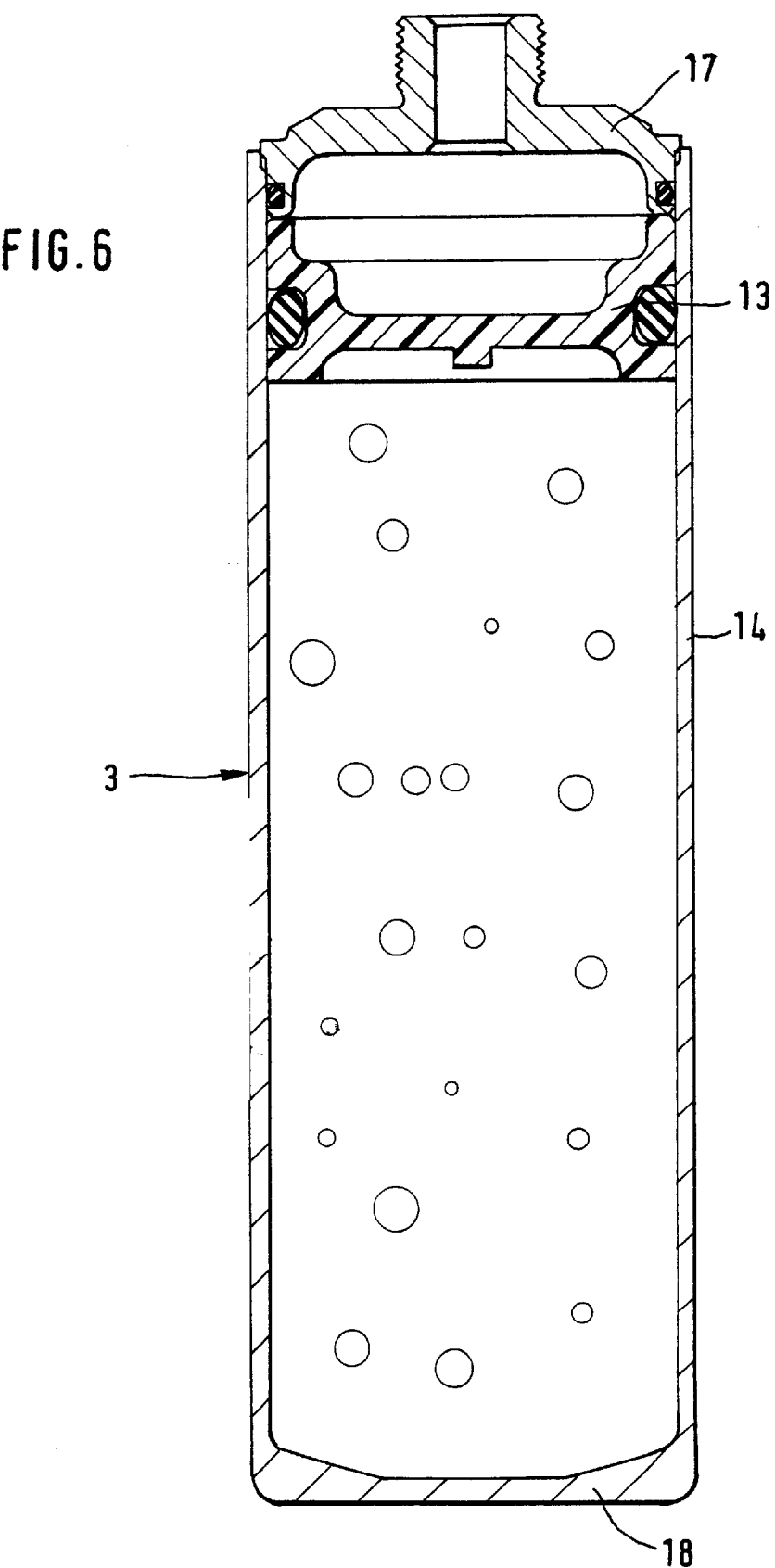
FIG. 6 is a longitudinal sectional view of an embodiment of a storage device whose bottom is produced in a single piece with the storage device wall.

FIG. 6 shows an embodiment of the storage device 3 having a storage device wall 14 embodied in a single piece with the bottom 18. This storage device 3 includes the connecting cover 17 as depicted in FIG. 2 having a threaded journal and is connected in a pressure-tight fashion to the storage device wall 14 after assembly of the separating piston 13.

Figure 7:
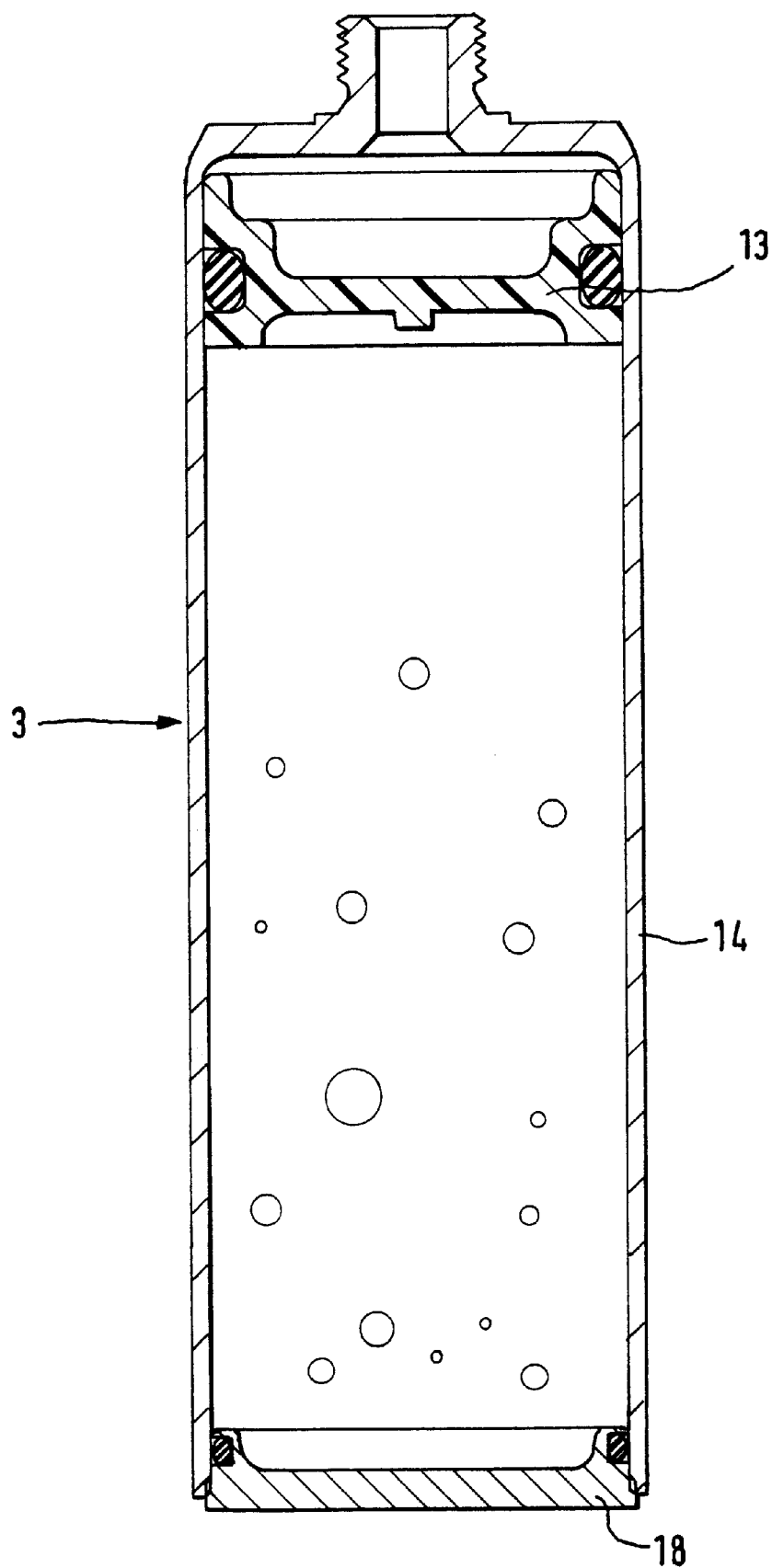
FIG. 7 is a longitudinal sectional view of another embodiment of the storage device in which a connecting cover is embodied in a single piece with the storage device wall.
Figure 8:
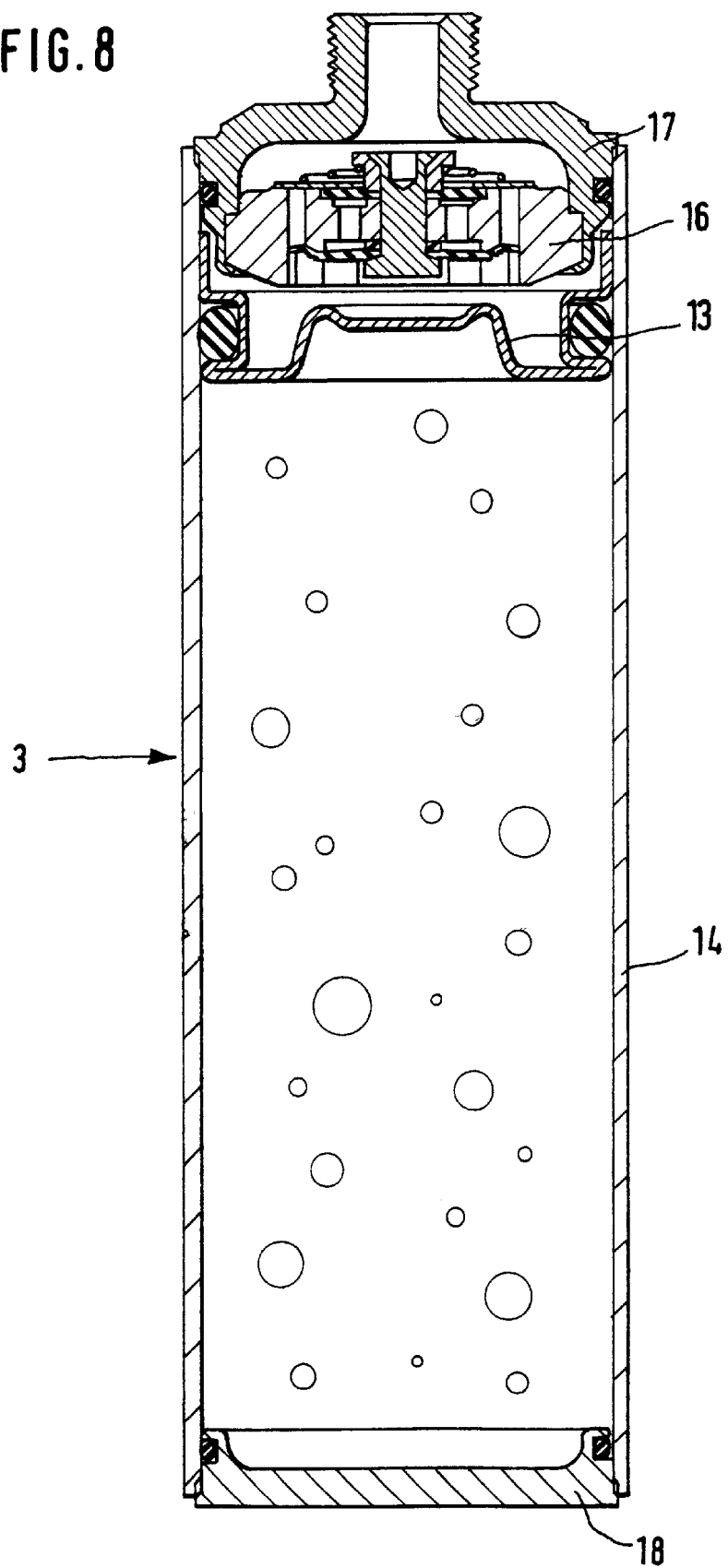
FIG. 8 is a longitudinal sectional view of another embodiment of the storage device equipped with a bottom damping valve.

In the embodiment of the storage device 3 shown in FIG. 7, the connecting cover 17 and the storage device wall 14 comprise a single piece of material. The bottom 18 is sealed by a sealing ring and then connected to the storage device 14, for example, by capacitor discharge welding, after attachment of the separating piston 13 to the storage wall 14. Yet another embodiment of the storage device 3 composed of a tubular storage device wall 14, a bottom 18 and a connecting cover 17 is shown in FIG. 8. This embodiment includes the addition of a bottom valve 16 securely connected to the connecting cover 17, preferably by rolling, while a separating piston 13 embodied as a sheet metal part borders the gas space.

In all of the above embodiments, an optimal bearing distance for the piston rod in the cylinder is attained because the storage device being arranged outside of the cylinder or container, while connection to the vehicle close to the vehicle tire is made possible by the arrangement of the storage device away from the vehicle wheel or by the angled arrangement of the axis of the storage device relative to the axis of the vibration damper. Thus, the smallest possible effect of the wheel guidance forces on the spring-and-damper unit is achieved, especially since the spring plate is arranged above the tire and, in addition, a counter-force can be produced by a suitably slanted positioning of the carrying spring.

The hydraulic connection between the interior of the cylinder and the storage device may be established in a wide variety of ways. In addition to the possibilities shown in the drawings, it is easily possible to create the hydraulic conduit by means of a channel connecting the working space remote from the piston rod to the storage device, for example, or by means of a tube.

We claim:

1. A spring-and-damper unit for installation between a body and a wheel guide part of a motor vehicle, comprising:

a vibration damper having a first end and a second end including a cylinder having a longitudinal axis and first and second ends corresponding respectively to said first and second ends of said vibration damper and filled with a damping fluid, and a piston rod sealingly projecting through said first end of said cylinder with a piston that sealingly runs within said cylinder and divides said cylinder into a first working space near said piston rod and a second working space remote from said piston rod;

said vibration damper further comprising a storage device having a longitudinal axis, said storage device being operatively arranged externally from said cylinder and hydraulically connected to said second working space of said cylinder for providing a compensation space for a volume of said piston rod moving into and out of said cylinder, said compensation space comprising a fluid space and gas space;

a spring plate fixedly mounted on said vibration damper; and a mechanical spring having an end supportably engaged in said spring plate, said storage device being fixedly mounted on said spring plate and hydraulically connected to said second working space via a connecting channel through said spring plate.

2. The spring-and-damper unit of claim 1, wherein said spring plate forms a structural and assembly unit with said storage device and said vibration damper being arrangable in the motor vehicle such that said storage device faces away from a wheel of the motor vehicle.

3. The spring-and-damper device of claim 1, wherein said storage device comprises an interior space of said spring plate.

4. The spring-and-damper device of claim 1, wherein said longitudinal axis of said storage device is one of parallel and inclined relative to said longitudinal axis of said cylinder.

5. The spring-and-damper device of claim 4, wherein said storage device is arranged at a radial distance from said vibration damper.

6. The spring-and-damper device of claim 1, wherein said storage device comprises a bottom with a fastening journal and said vibration damper comprises a connecting part connected to said fastening journal.

7. The spring-and-damper device of claim 1, wherein said storage device comprises a one-piece storage device wall and a bottom, and a separating piston for separating said fluid space from said gas space.

8. The spring-and-damper device of claim 1, wherein said storage device comprises a first piece including a storage device wall portion and a connecting cover portion, a separating piston for separating said fluid space from said gas space and a bottom piece sealingly connected to said storage device wall.

9. The spring-and-damper device of claim 1, wherein said storage device comprises a bottom valve secured in said fluid space.

10. The spring-and-damper device of claim 1, wherein said storage device comprises a storage device wall with a connecting cover and a bottom valve secured in said connecting cover forming a structural unit with said connecting cover that is testable separately from said storage device.

11. The spring-and-damper device of claim 1, wherein said longitudinal axis of said storage device is inclined relative to said longitudinal axis of said cylinder and said storage device is arranged such that a longitudinal length of said storage device passes a drive shaft of a wheel of the vehicle at a distance.

12. A spring-and-damper unit for installation between a body and a wheel guide part of a motor vehicle, comprising:

a vibration damper having a first end and a second end including a cylinder having a longitudinal axis and first and second ends corresponding respectively to said first and second ends of said vibration damper and filled with a damping fluid, and a piston rod sealingly projecting through said first end of said cylinder with a piston that sealingly runs within said cylinder and divides said cylinder into a first working space near said piston rod and a second working space remote from said piston rod;

said vibration damper further comprising a storage device having a longitudinal axis, said storage device being operatively arranged externally from said cylinder and hydraulically connected to said second working space of said cylinder for providing a compensation space for a volume of said piston rod moving into and out of said cylinder, said compensation space comprising a fluid space and gas space;

a spring plate fixedly mounted on said vibration damper; and a spring having an end supportably engaged in said spring plate, said storage device being fixedly mounted on said spring plate and hydraulically connected to said second working space via a connecting channel through said spring plate, wherein said vibration damper further comprises a steering lever connected with said spring plate such that said spring plate, said storage device, and said steering lever form a structural and assembly unit of said spring-and-damper device.

13. A spring-and-damper unit for installation between a body and a wheel guide part of a motor vehicle, comprising:

a vibration damper having a first end and a second end including a cylinder having a longitudinal axis and first and second ends corresponding respectively to said first and second ends of said vibration damper and filled with a damping fluid, and a piston rod sealingly projecting through said first end of said cylinder with a piston that sealingly runs within said cylinder and divides said cylinder into a first working space near said piston rod and a second working space remote from said piston rod;

said vibration damper further comprising a storage device having a longitudinal axis, said storage device being operatively arranged externally from said cylinder and hydraulically connected to said second working space of said cylinder for providing a compensation space for a volume of said piston rod moving into and out of said cylinder, said compensation space comprising a fluid space and gas space;

a spring plate fixedly mounted on said vibration damper; and a spring having an end supportably engaged in said spring plate, said storage device being fixedly mounted on one of said spring plate and said second end of said vibration damper, wherein said longitudinal axis of said storage device is substantially perpendicular to said longitudinal axis of said cylinder, said vibration damper comprises a steering lever, and said steering lever is connected to a bottom of said storage device.

* * * * *